United States Patent [19]
Nakamura

[11] 4,417,785
[45] Nov. 29, 1983

[54] LIQUID CRYSTAL DISPLAY WITH NEGATIVE TIMING SIGNAL AND DIELECTRIC INVERSION

[75] Inventor: Haruo Nakamura, Suwa, Japan
[73] Assignee: Kabushiki Kaisha Suwa Seikosha, Tokyo, Japan
[21] Appl. No.: 284,753
[22] Filed: Jul. 20, 1981

Related U.S. Application Data

[63] Continuation of Ser. No. 973,761, Dec. 27, 1978, abandoned.

[30] Foreign Application Priority Data

Dec. 27, 1977 [JP] Japan .................................. 52-160844
Dec. 29, 1977 [JP] Japan .................................. 52-159310

[51] Int. Cl.³ ............................................. G02F 1/133
[52] U.S. Cl. ................................. 350/346; 350/331 T
[58] Field of Search ................ 340/784; 350/331, 332, 350/333, 346, 349

[56] References Cited

U.S. PATENT DOCUMENTS

| | | | |
|---|---|---|---|
| 3,857,629 | 12/1974 | Freiser | 350/346 |
| 3,907,405 | 9/1975 | Fukai et al. | 350/331 T X |
| 3,914,022 | 10/1975 | Kashnow | 350/340 |
| 4,009,934 | 3/1977 | Goodwin et al. | 350/346 |
| 4,093,356 | 6/1978 | Bigelow | 350/338 |
| 4,236,155 | 11/1980 | Nagata | 350/346 |

Primary Examiner—John K. Corbin
Assistant Examiner—David Lewis
Attorney, Agent, or Firm—Blum, Kaplan, Friedman, Silberman and Beran

[57] ABSTRACT

A liquid crystal display device includes a display element containing a liquid crystal display composition for operating in the twisted nematic mode and a two-frequency matrix-addressing circuit for driving the display element. The liquid crystal composition has a critical frequency $f_c$ such that at lower frequencies, the dielectric anisotropy of said composition is positive and at higher frequencies is negative, $f_c$ lying between the low frequency and high frequency components in the output of said circuit. The arrangement of the device is such that a selected picture cell in said display element can be turned off by applying the high frequency component of said output. Other embodiments include a device in which a dichroic dye is incorporated in the composition and an embodiment which contains means for detecting the temperature of the liquid crystal composition. The effect of temperature change on the performance of the device is compensated by changing the frequency of one of the components or by changing the voltage of the output from the circuit.

4 Claims, 17 Drawing Figures

LIQUID CRYSTAL DISPLAY WITH NEGATIVE TIMING SIGNAL AND DIELECTRIC INVERSION

This is a continuation, of application Ser. No. 973,761, filed Dec. 27, 1978, now abandoned.

BACKGROUND OF THE INVENTION

The present invention relates to a liquid crystal display device driven by a multiplexed signal which is the output from a two-frequency matrix-addressing circuit. The device includes a twisted nematic liquid crystal display element incorporating a liquid crystal material having a dielectric anisotropy which is frequency-dependent. The composition and the liquid crystal display device are constructed for operating in the TN-mode, well known to those skilled in the art. Also, the composition may contain a dichroic dye in a Guest-Host relationship, the mode of operation being referred to as PGH.

Such liquid crystal display elements are now broadly used as digital displays in electronic desk calculators, wristwatches and the like. Where it is necessary to produce the display consisting of many picture cells or elements, as, for example, the XY matrix display, it is a precondition to adopt multiplex driving because of the necessity to decrease the number of terminals which must be electrically connected with the driving circuit and so as to simplify the driving circuit itself. Moreover, it is essential to use AC drive in order to lengthen the life of the liquid crystal material. Multiplex driving of a liquid crystal display element is now termed the generalized AC amplitude-selective multiplexing method.

While a number of such constructions are now known, difficulties are encountered, principally with respect to contrast and with respect to establishing and maintaining suitable voltage levels for turning the display ON and OFF. The present invention is designed to eliminate these difficulties.

SUMMARY OF THE INVENTION

A liquid crystal display device in accordance with the present invention includes a liquid crystal display element containing a liquid crystal material for operating in the twisted nematic mode. Also included is a two-frequency matrix-addressor circuit for driving picture cells in said display. The liquid crystal material has a critical frequency $f_c$ at which $\epsilon_{\parallel}$ equals $\epsilon_{\perp}$. This critical frequency lies between the low frequency component, $f_L$, and the high frequency component, $f_H$, of the output of said circuit. The dielectric anisotropy of said material is positive at said lower frequency and negative at said higher frequency. The output from said matrix-addressor circuit comprises a timing signal and a data signal, proper combination of the signal phases and frequencies being required for turning a picture element ON or OFF. In this first embodiment, the high frequency is used for turning the picture cell OFF.

In a second embodiment of the invention, the liquid crystal material includes a dichroic dye and the picture cell is turned OFF by the application of low frequency.

In a third embodiment of the invention, the device incorporates an device for determining the temperature of the liquid crystal display element, this feature being important because of the fact that variation in temperature adversely affects the contrast of the display. The effect of temperature change on the contrast of the display is compensated by the circuit which can change at least one of the frequencies $f_L$ or $f_H$ or can change the voltage of one of the frequencies $f_L$ and $f_H$.

Accordingly, an object of the present invention is a liquid crystal display device including a display element for operating in the twisted nematic mode and a two-frequency matrix-addressor circuit for selectively activating picture cells within said display cell, said circuit being arranged and constructed for turning OFF said picture cell by the application of the high frequency component of the output of said circuit to said picture cell.

Another object of the present invention is a liquid crystal display device including a nematic liquid crystal display element and a two-frequency matrix-addressing circuit wherein the liquid crystal material in said liquid crystal display element contains a dichroic dye therein and selected picture cells in said display element are turned OFF by the application of the low frequency in the output of said circuit.

A further object of the present invention is a liquid liquid crystal display device having a nematic liquid crystal material in a liquid crystal display element for operating in the twisted nematic mode wherein said liquid crystal material has a critical frequency intermediate the two frequencies of the output of said circuit, said device including means for detecting the temperature of the liquid crystal material.

An important object of the present invention is a liquid crystal display device including a nematic liquid crystal element for operating in the twisted nematic mode and a two-frequency matrix-addressor circuit for driving the nematic liquid crystal display element, the nematic liquid crystal material in said element having a critical frequency intermediate the two frequencies of the output of said circuit and including means for changing at least one of said two frequencies to compensate for the effect of temperature on the contrast of the device.

A significant object of the present invention is a liquid crystal display device including a nematic liquid crystal display element for operating in the twisted nematic mode and a two-frequency matrix-addressing circuit for driving said nematic liquid crystal display element, said device including means for changing at least one of the voltages of the two frequencies in the output of said circuit for compensating for the effect of temperature on the performance of said device.

Still other objects and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
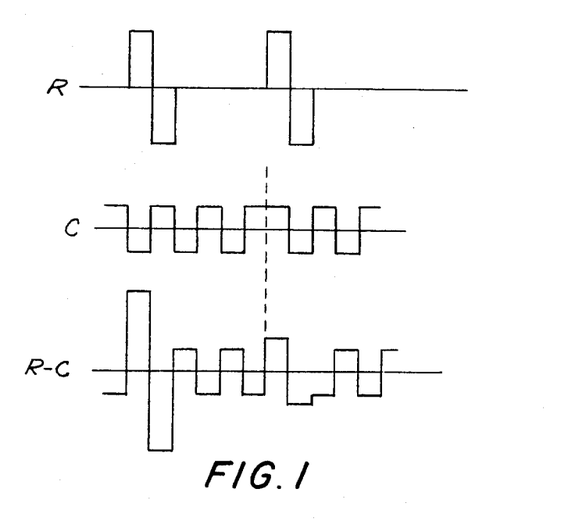
FIG. 1 is a characteristic driving wave form used in a conventional generalized AC amplitude-selective method.

Referring first to FIG. 1, an example of a driving wave form is shown, this wave form corresponding to the generalized AC amplitude selective multiplexing method. The curve bearing the reference character R is a timing signal, that indicated by the character C is a data signal and the last curve shows the difference between the two signals, namely, R-C which is applied across a selected liquid crystal picture cell. In this construction, the ratio of the effective voltage value in the selected condition ($V_{ON}$) to that in the non-selected condition ($V_{OFF}$) is at a maximum when the ratio of the voltage of the signal R to that of the signal C is $\sqrt{n}:1$, wherein n is the number of rows in a matrix, this being equal to the reciprocal of the duty ratio.

The following formula for the ratio between $V_{ON}/V_{OFF}$ is derived:

$$V_{ON}/V_{OFF} = \left\{ \left( \sqrt{n} + 1 \right) / \left( \sqrt{n} - 1 \right) \right\}^{\frac{1}{2}} . \quad A$$

As is evident from formula A as n is increased, the ratio of $V_{ON}/V_{OFF}$ decreases and approaches 1 as a limit.

Figure 2:
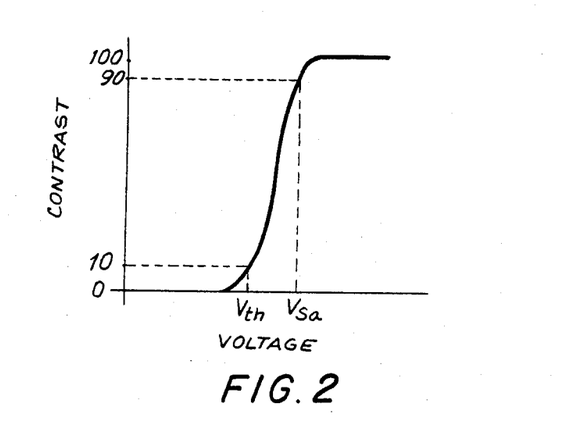
FIG. 2 shows the relationship between the voltage and contrast in a liquid crystal display device operating in the TN mode.

The relationship between the voltage and the contrast for a device in accordance with the present invention operating by the TN method is shown in FIG. 2 where $V^{th}$ is the voltage which provides a contrast corresponding to 10% saturation and Vsa gives a contrast corresponding to 90% of saturation. A minimum requirement for the ON and OFF voltage is that the ON voltage must be higher than Vsa and the OFF voltage must be lower than Vth. Accordingly, the value of the ratio $V_{ON}/V_{OFF}$ must be larger than Vsa/Vth. However, up to the present time, when n is larger than 8, it has not been possible to satisfy the condition and sufficient contrast has not been available. For this reason, in operating according to the conventional generalized AC amplitude selective multiplexing method, the contrast ratio between the lit condition and the non-lit condition deteriorates as the number of rows to be driven increases. This deterioration becomes strongly evident to the eye, and the present invention completely eliminates this problem.

Figure 3:
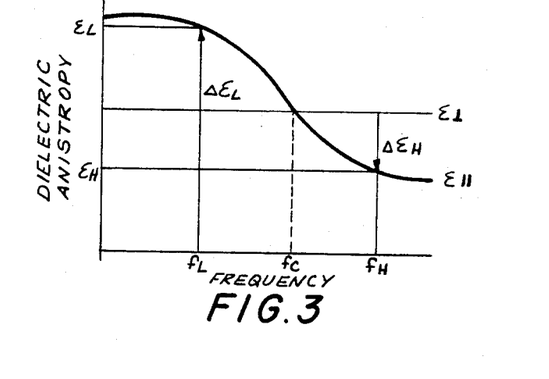
FIG. 3 illustrates the frequency dependence of the dielectric anisotropy of the liquid crystal composition used according to the present invention.

FIG. 3 shows the frequency dependence of the dielectric constant of the liquid crystal used in the present invention. In this Figure, $\epsilon_\parallel$ and $\epsilon_\perp$, respectively, represent the dielectric constant in the length direction and in the transverse or width direction of the liquid crystal molecules. The liquid crystal material is characterized by a critical frequency $f_c$ at which the two dielectric constants are equal. The dielectric constant in the length direction is denoted as $\epsilon_L$ when the frequency is lower than $f_c$ and as $\epsilon_H$ when the frequency is higher than $f_c$. Since the dielectric constant decreases as the frequency is increased from below $f_c$ to above $f_c$, it follows that $\epsilon_L > \epsilon_\perp$ and $\epsilon_H < \epsilon_\perp$ and the dielectric anisotropy defind as $$\Delta\epsilon = \epsilon_\parallel - \epsilon_\perp$$

changes from positive to negative.

Figure 4:
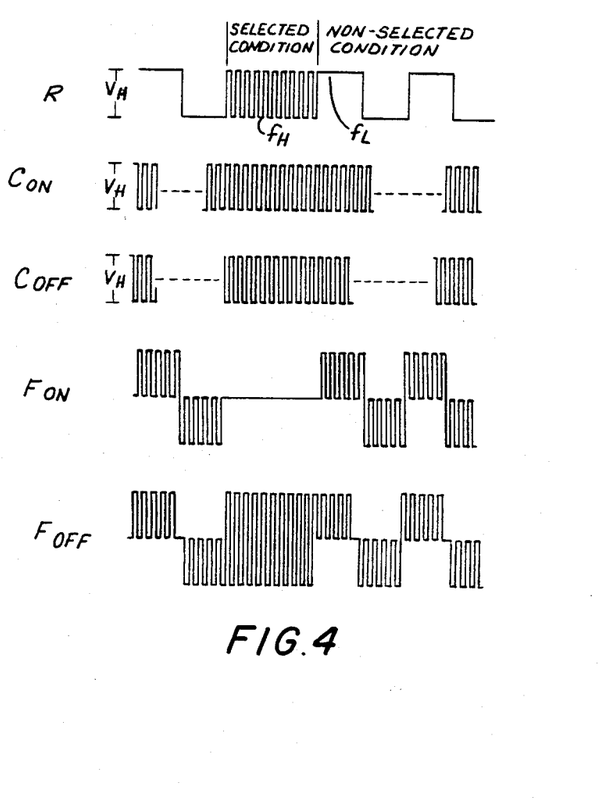
FIGS. 4 and 5 exemplify the two-frequency matrix-addressing technique of embodiments of the present invention.

The driving method for a first embodiment of the present invention is exemplified in FIG. 4 showing the output applied by the two-frequency matrix-addressing circuit in accordance with the present invention. The timing signal is indicated by the reference character R, the rectangular high-frequency component being applied in the selected condition and the low-frequency component being applied in the non-selected condition. $C_{ON}$ and $C_{OFF}$ are respectively the data signals for the ON and OFF conditions. The signal $C_{ON}$ is in phase for the selected condition of signal R and the signal $C_{OFF}$ is 180° out-of-phase with the data signal R in the selected condition. Consequently, the signals applied to a selected picture cell or element have the voltages shown by the curves designated $F_{ON}$ and $F_{OFF}$ which turns the picture cell OFF when the high frequency is applied in the selected condition and in the condition ON when the applied voltage is zero. This method of operation is the reverse of that used conventionally, the device being constructed for operating in this fashion. The method of operation may be called NTM, namely, the negative timing method.

In the description of the NTM method, the high frequency and low frequency components of the signal are denoted as $f_H$ and $f_L$, and the dielectric anisotropy, $\Delta\epsilon$, is respectively denoted by $\Delta\epsilon_H$ which is less than zero and $\Delta\epsilon_L$ which is greater than zero. The voltage of the low frequency component $f_L$ which is applied in static driving should be at least Vsa as shown in FIG. 2 and is termed $V_L$. Next, Vsa which is applied as the compounded wave form of $f_H$-$f_L$ in static driving is denoted as $V_H$, this being the wave form of $f_{ON}$ and $f_{OFF}$ in the non-selected condition in FIG. 4. Then $V_H$ of the compounded wave form $f_H$-$f_L$ corresponds to $V_L$ which is obtained by a static drive of frequency $f_L$. Then, this compounded wave form of $f_H$-$f_L$ is added to $F_{ON}$ and $F_{OFF}$ in the non-selected condition of FIG. 4; the square of the effective value applied in static driving is expressed as $$V_L^2 \cdot \frac{n-1}{n},$$

n being the number of rows in the device.

In the wave form during the selected condition, the applied voltage in the condition ON is zero, so that the effective voltage value also becomes zero. Also, the applied voltage in the condition OFF of the wave form having the frequency $f_H$ is $V_H$ so that the value of the square of the effective voltage becomes $V_H^2/n$, and also, the value of at the frequency $f_H$ is negative and operates negatively on the whole voltage. The following equations are then obtained:

$$V_{ON} = V_L \sqrt{1 - \frac{1}{n}} \quad (1)$$

$$V_{OFF} = \sqrt{V_L^2 \left(1 - \frac{1}{n}\right) - \frac{|\Delta\epsilon_H|}{\Delta\epsilon_L} V_H^2 \cdot \frac{1}{n}} \quad (2)$$

Formula 1 gives the effective voltage in the condition ON and formula 2 the effective voltage in the condition OFF. From the two equations, it can be seen that $V_{ON}$ is smaller than $V_L$ so that it is necessary to set the value of $V_L$ so that $V_{ON}$ is higher than Vsa. Also, from formulas 1 and 2, the ratio of the two voltages can be obtained:

$$V_{ON}/V_{OFF} = \left\{1 - \frac{\frac{|\Delta\epsilon_H|}{\Delta\epsilon_L}}{n-1} \left(\frac{V_H}{V_L}\right)^2 \right\}^{-\frac{1}{2}} \quad (3)$$

It is important to note that this voltage ratio depends not only on the number of rows but on the voltage of the high frequency component $V_H$. This is different from the conventional method in that it indicates that the higher the value of the applied voltage, the larger the voltage ratio becomes. It should be noted that the value of $V_L$ is determined by setting the value of $f_L$ which in this case is constant.

From the formula (3) it can be seen that when $$V_H = V_L \sqrt{\frac{\Delta\epsilon_L}{|\Delta\epsilon_H|}(n-1)},$$

then $V_{ON}/V_{OFF} \to \infty$, and when $$V_H > V_L \sqrt{\frac{\Delta\epsilon_L}{|\Delta\epsilon_H|}(n-1)},$$

then the ratio $V_{ON}/V_{OFF}$ becomes imaginary. The meaning of this development is that the force applied to the liquid crystal molecules tends to align them in parallel with the glass plates making up the walls of the cell even though the molecules are already aligned in this direction. Actually, $V_H$ is determined by setting $V_{ON}/V_{OFF}$ to a selected value which is as large as possible but which is less than $V^{th}$. In order to establish the relation between $V_H$ and $V_L$, the significance of $\Delta\epsilon$ with respect to the driving method of the present invention must be examined. The relationship between Vsa of Fig. and the dielectric anisotropy $\Delta\epsilon$ is expressed generally by the following formula:

$$V^2_{sa} = \gamma^2 \frac{\pi^2 \cdot k}{\Delta\epsilon \cdot \epsilon_0}. \quad (4)$$

In the above equation, $\epsilon_0$ is the dielectric constant of vacuum, k is the elastic constant of the liquid crystal material and $\gamma$ is the ratio of Vsa to Vth (Vsa/Vth). From the above equation, the following formula is obtained:

$$\Delta\epsilon_L V_L^2 = \Delta\epsilon_L \left(\frac{V_H}{2}\right)^2 + \Delta\epsilon_H \left(\frac{V_H}{2}\right)^2 = \quad (5)$$

$$\frac{\gamma^2 \cdot \pi \cdot k}{\epsilon_0} (= \text{constant})$$

From equation (5), the following formula relating $V_L$ and $V_H$ is obtained:

$$V_H = 2V_L \sqrt{\frac{\Delta\epsilon_L}{\Delta\epsilon_L + \Delta\epsilon_H}}. \quad (6)$$

Substituting equation (6) into equation (3), $$V_{ON}/V_{OFF} = \left(1 - \frac{4}{n-1} \cdot \frac{|\Delta\epsilon_H|}{\Delta\epsilon_L - |\Delta\epsilon_H|}\right)^{-\frac{1}{2}} \quad (7)$$

In order to satisfy equation (5) with respect to the optional values of $f_L$ which must be lower than $f_c$ and $f_H$ which must be higher than $f_c$ which carries with it the corresponding values of $\Delta\epsilon_L$ and $\Delta\epsilon_H$ formula (5) can be rewritten as follows:

$$\Delta\epsilon_L V_L^2 = \Delta\epsilon_L \left(\frac{mV_H}{2}\right)^2 + \Delta\epsilon_H \left(\frac{V_H}{2}\right)^2 = \quad (8)$$

$$\frac{\gamma\pi^2 k}{\epsilon_0} (= \text{constant}).$$

In equation (8) m is an optional real number which may have the value 1. Then equations (6) and (7) may be rewritten as follows:

$$V_H = 2V_L \frac{\Delta\epsilon_L}{m^2 \Delta\epsilon_L + \Delta\epsilon_H} \quad (9)$$

$$V_{ON}/V_{OFF} = \left(1 - \frac{4}{n-1} - \frac{|\Delta\epsilon_H|}{m^2 \Delta\epsilon_L - |\Delta\epsilon_H|}\right)^{-\frac{1}{2}} \quad (10)$$

Figure 5:
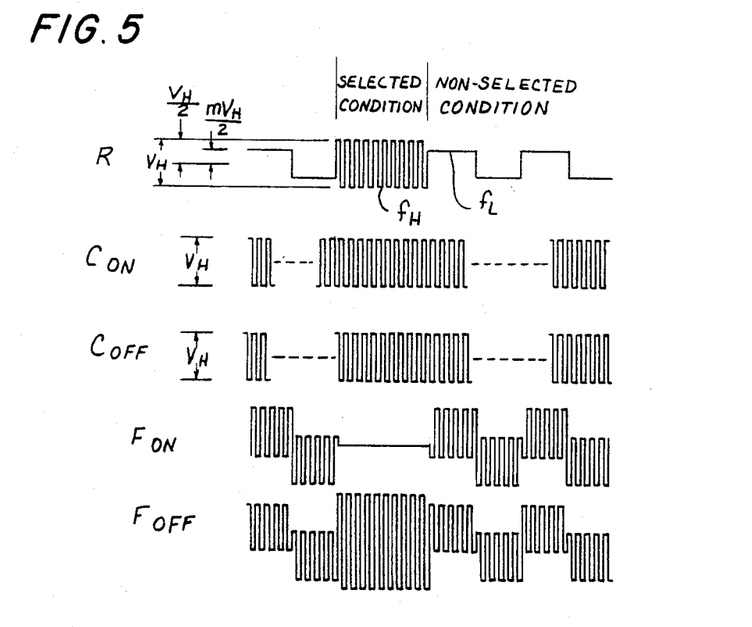
Figure 6:
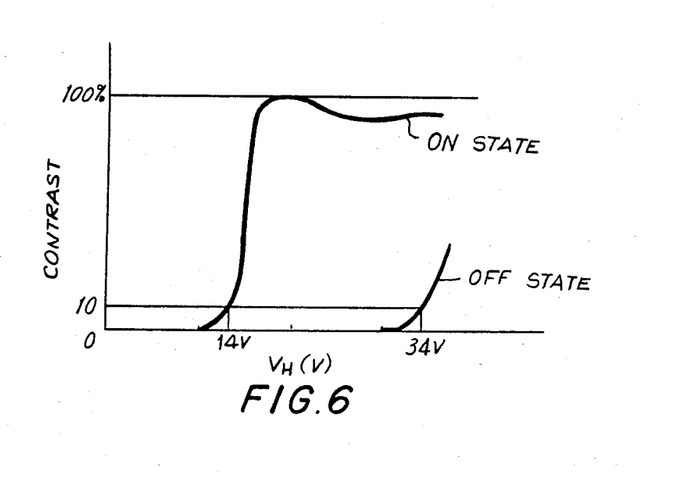
FIG. 6 shows the voltage-contrast curve of the ON wave form and OFF wave form obtained in driving a sixteen-row matrix by the multiplex method in accordance with the present invention.
Figure 7:
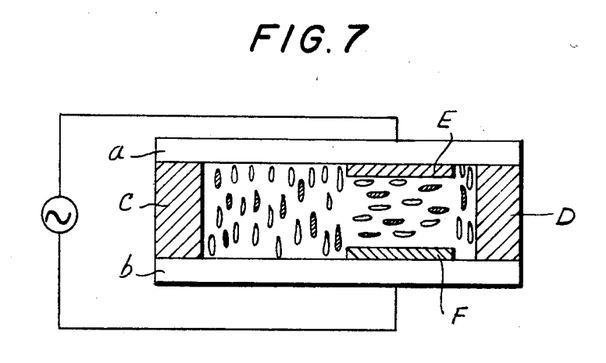
FIG. 7 is a schematic view of a section of a perpendicularly-ordered liquid crystal display cell containing a dichroic dye.

The effect of introducing m as in equation (8) is shown in FIG. 5 in which $C_{ON}$ and $C_{OFF}$ remain exactly the same as shown in FIG. 4. However in timing wave form R the voltage in the selected condition is m × that in the non-selected condition. FIG. 5 shows the case for m<1. Using this method, $f_H$ and $f_L$ are selected on the basis of the frequency dependence of the liquid crystal to give the optimal effect. This is shown in FIG. 6 which is the voltage-contrast curve which is actually obtained. For example, a contrast of 100% can be obtained when the liquid crystal is driven with $V_H$ of 20 V.

In a second embodiment of the invention, the mode of operation is designated as PGM. The frequency dependence of the dielectric constant $\epsilon_{\parallel}$ of the nematic liquid crystal used in the display cell has been described with reference to FIG. 3. The liquid crystal display element in this second embodiment contains dichroic dye. Normally, that is when a picture cell is in the OFF condition, the molecules in the display element are aligned perpendicularly to the cell plates. When a high frequency is applied, the liquid crystal molecules align themselves in parallel with the cell plates whereupon the dichroic dye shows its color. Thus, the picture cell can be made to turn OFF by applying the low frequency component in the selected condition which is the reverse way of operation with respect to the first embodiment of the present invention.

Figure 8:
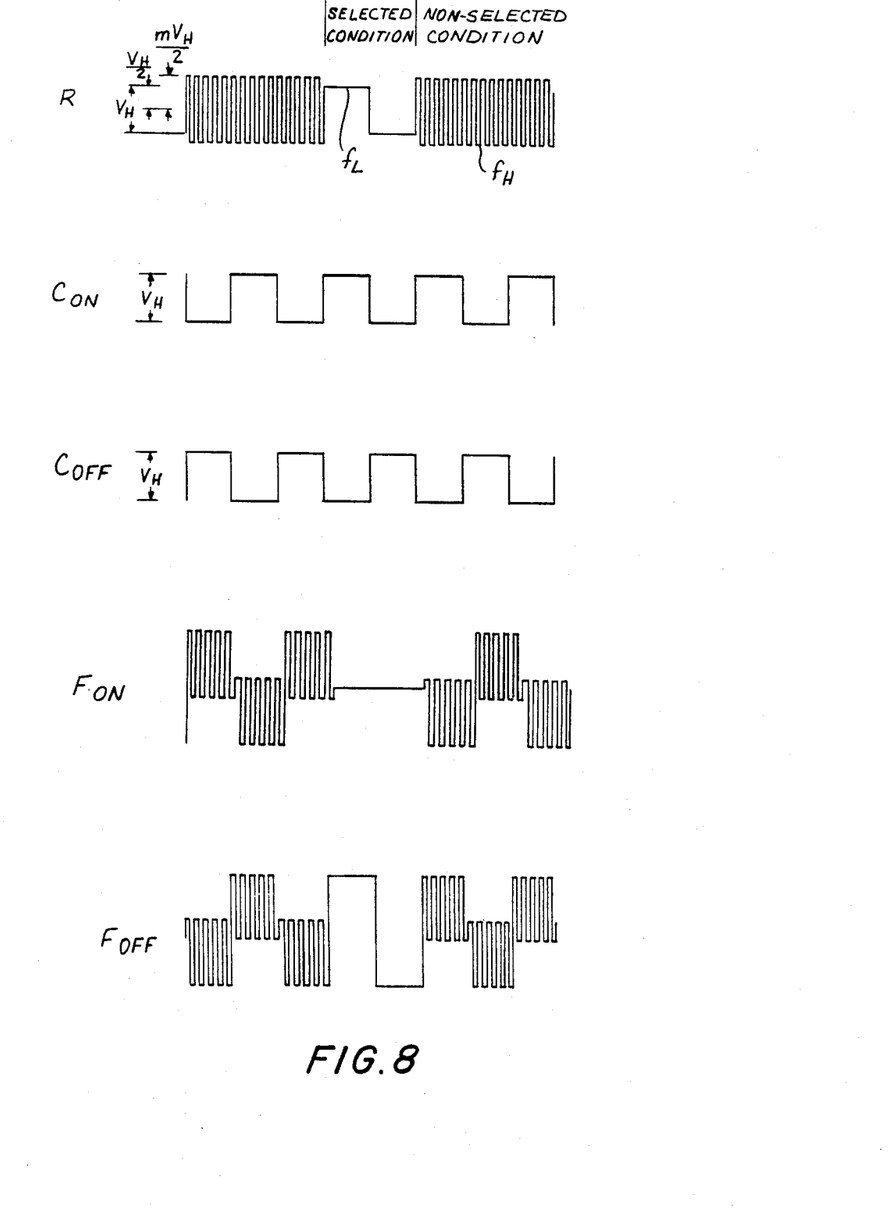
FIG. 8 is a driving wave form for a liquid crystal display element containing a dichroic dye.

The driving wave form in accordance with this second embodiment is shown in FIG. 8. The driving principle is exactly the reverse of that of the first embodiment with respect to the frequency. Accordingly, the formulas (1), (2) and (3) can also be adapted to the present mode of operation and formulas (5) to (10) can be adapted by exchanging $\Delta\epsilon_L$ and $\Delta\epsilon_H$ with each other. Equations (8), (9) and (10) are rewritten as follows:

$$|\Delta\epsilon_H|V_{L2} = |\Delta\epsilon_H|\left(\frac{mV_H}{2}\right)^2 - \Delta\epsilon_L\left(\frac{V_H}{2}\right)^2 = \quad (11)$$

$$\gamma\pi^2 k \,(= \text{constant}).$$

$$V_H = 2V_L \sqrt{\frac{|\Delta\epsilon_H|}{m^2 \cdot |\Delta\epsilon| - \Delta\epsilon}} \quad (12)$$

$$V_{ON}/V_{OFF} = \left(1 - \frac{4}{n-1} \frac{\Delta\epsilon_L}{m^2|\Delta\epsilon_H|\Delta\epsilon_L}\right)^{-\frac{1}{2}} \quad (13)$$

Figure 9:
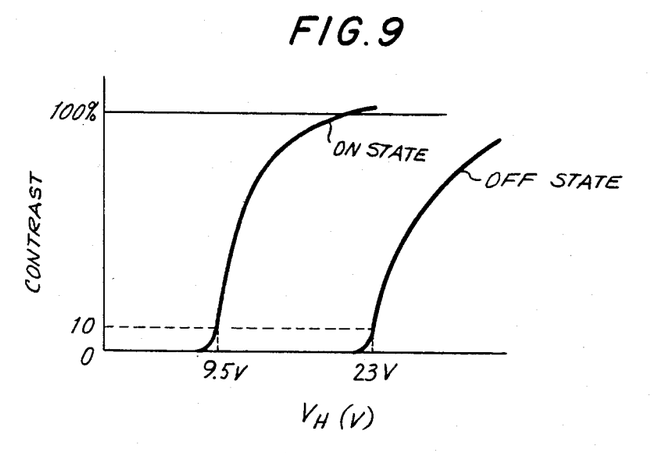
FIG. 9 shows the voltage-contrast curve of the ON and OFF wave forms obtained in the driving of an eight-row liquid crystal display device wherein a dichroic dye is added to the liquid crystal material.

It must be noted that the value of k in formula (11) is different from that in formula (8) because the method of initial ordering is different. FIG. 9 shows the voltage-constrast curve obtained by driving an eight-row matrix display by the method of the present embodiment.

In a third embodiment of the present invention, means are provided for compensating for the effect of temperature on the properties of the liquid crystal material which in turn affects the contrast of the display. Characteristics which are involved are the elastic coefficient, the viscosity and the dielectric constant which are all greatly changed by change in temperature. A significant feature is the threshold voltage and the following equation describes the threshold voltage taking the response time $\tau$ into consideration:

$$V_{th}(\tau) = \sqrt{\frac{\eta L^2}{\epsilon_0 \Delta\epsilon} \frac{1}{\tau} + \frac{k\pi^2}{\epsilon_0 \Delta\epsilon}} \quad (14)$$

In equation (14), $\eta$ is the viscosity, L is the thickness of the liquid crystal cell and the other terms have already been defined. Of the terms in the above equation, $\epsilon_0$ and L are constants and $\eta$, k and $\Delta\epsilon$ are variables depending on the temperature. Accordingly, the threshold voltage Vth changes with temperature change.

Now suppose that $\tau \to \infty$ and that the term which is dependent on the response time $\tau$ is omitted, thereby leading to equation (15):

$$V_{th} = \sqrt{\frac{k\pi^2}{\epsilon_0 \Delta\epsilon}}. \quad (15)$$

According to equation (15), Vth is dependent on $\Delta\epsilon$ and k, but the values of these two quantities change with temperature. Moreover, the critical frequency $f_c$ at which the dielectric anisotropy is zero is strongly dependent on the temperature. As a result, $\Delta\epsilon$ also must change strongly with temperature. Therefore Vth must be dependent upon frequency (f) as well as on temperature, leading to the following modification of equation (15):

$$V_{th} = \sqrt{\frac{\pi}{\epsilon_0} \frac{k(t)}{\Delta\epsilon(f,t)}} \quad (t: \text{temperature}) \quad (16)$$

Equation (16) expresses the threshold voltage Vth as a function of both temperature and frequency.

Figure 10:
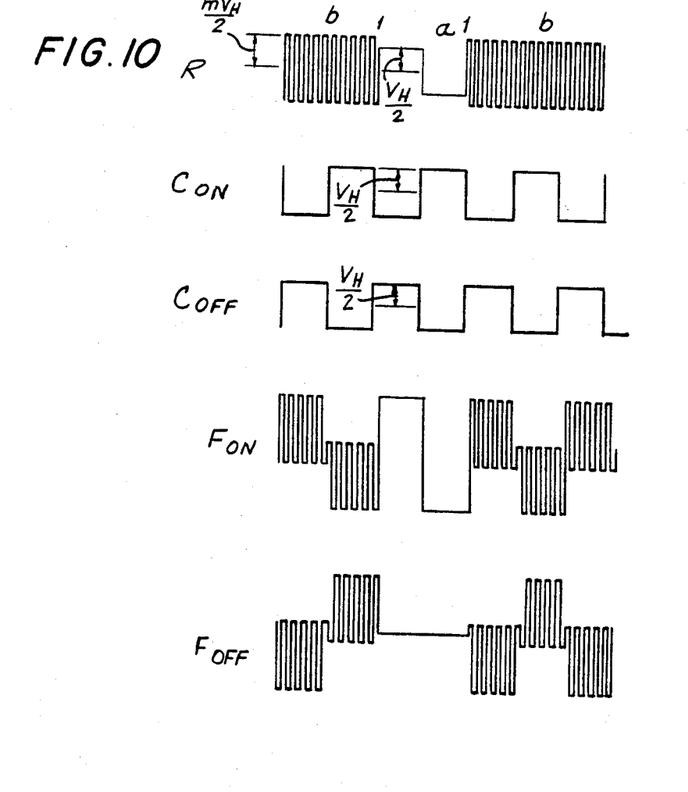
FIG. 10 is a driving wave form for a device incorporating a temperature-determining element.

The method by which this third embodiment of the two-frequency matrix-addressing circuit operates to compensate for change in temperature is illustrated in the Figures beginning with FIG. 10, FIG. 10 showing an example of the applied signal in the two-frequency matrix-addressing system. The timing signal is indicated by the reference character R and contains a rectangular wave of low frequency, $f_L$ which is applied in the selected condition in the period a between the two diagonal lines and a rectangular wave of high frequency $f_H$ which is applied in the non-selected condition during the periods indicated by the letter b. The lines indicated by $C_{ON}$ and $C_{OFF}$ are the data signals that signify ON or OFF and the signal $F_{ON}$ (R-$C_{ON}$) or $F_{OFF}$ (R-$C_{OFF}$) is applied to the liquid crystal picture cell in correspondence to the data signal in an ON or OFF state.

The effective voltages in the ON state and the OFF state and the ratio between them are expressed in the following equations:

$$V_{ON} = \sqrt{V_L^2\left(1 - \frac{1}{n}\right) + V_H^2 \cdot \frac{1}{n}} \quad (17)$$

$$V_{OFF} = V_L\sqrt{1 - \frac{1}{n}} \quad (18)$$

$$V_{ON}/V_{OFF} = 1 + \frac{1}{n-1}\left(\frac{V_H}{V_L}\right)^2. \quad (19)$$

Figure 11A:
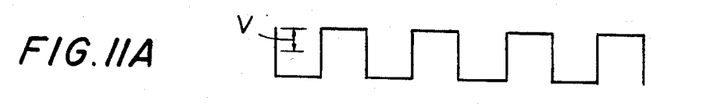
FIGS. 11A and 11B show another driving wave form in accordance with the present invention.

In the above equations, n is the number of lines in the matrix display, $V_L$ is the value V shown in FIG. 11A which is the threshold voltage using the simple rectangular wave form of frequency $f_L$ as shown in FIG. 11A. Also, $V_H$ is the value of the threshold voltage V which is applied by the wave form for $F_{ON}$ and $F_{OFF}$ in non-selected condition.

Figure 11B:
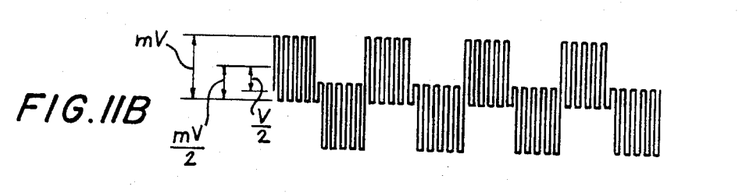
Figure 12:
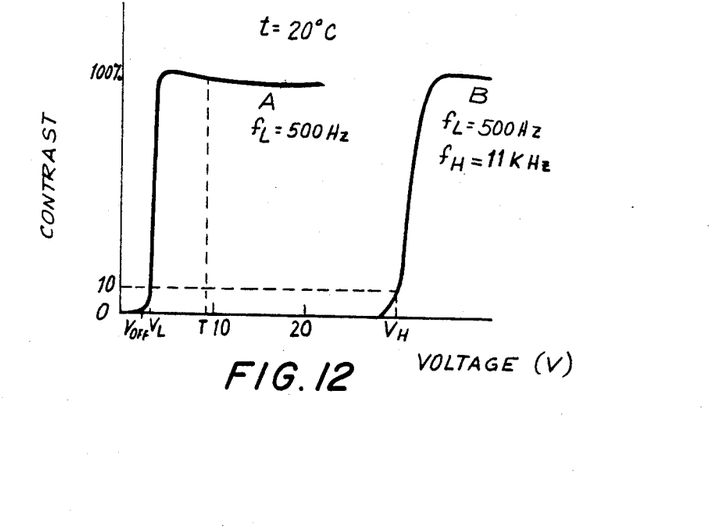
FIG. 12 is the voltage-contrast curve obtained by the use of the wave form shown in FIG. 11.

Curves A and B in FIG. 12 are voltage-contrast curves obtained by using the wave forms in FIGS. 11A and 11B, respectively, with m=1, $V_L$=3.2 V and $V_H$=30 V. Substituting these values into equations (17), (18) and (19) with the number of lines in the matrix, n=16, the values $V_{ON}$=8.11 V, $V_{OFF}$=3.10 V and $V_{ON}/V_{OFF}$=2.62 are obtained. The curves for $V_{ON}$ and $V_{OFF}$ in FIG. 12 correspond to these values.

Figure 13:
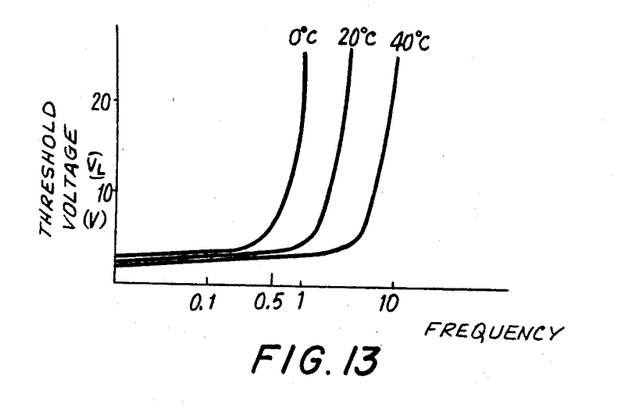
FIG. 13 shows V of FIG. 12 expressed as a function of frequency with temperature as a parameter.

As aforenoted, very clear contrast can be obtained when the temperature is constant. Now, taking into consideration the change in the threshold voltage with temperature, it becomes evident from equation (16) that Vth is temperature dependent, and moreover, the dielectric anisotropy $\Delta\epsilon$ which must be used in accordance with the present invention changes with frequency as well as with temperature. The frequency-threshold voltage characteristic is shown in FIG. 13 in which the temperature, t, is the parameter. The abscissa in FIG. 13 is the high frequency component, $f_H$ and the ordinate is the voltage $V_L$ of the low frequency component.

Figure 14:
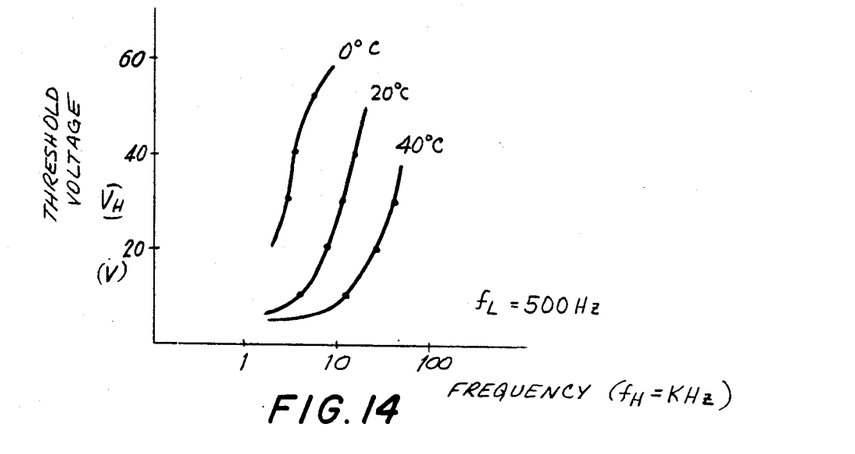
FIG. 14 shows $V_L$ of FIG. 12 as modified by changing the high frequency component $f_H$ to compensate for temperature change, the low frequency component $f_L$ being 500 Hz.
Figure 15:
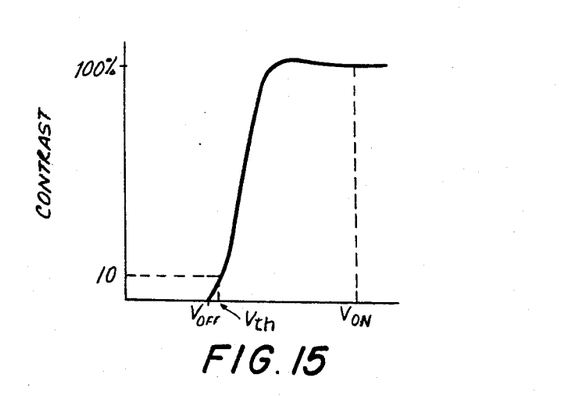
FIG. 15 shows the relationship of the threshold voltage $V_{th}$ and $V_{ON}$ and $V_{th}$ and $V_{OFF}$ in the voltage-contrast curve.

FIG. 14 has as the abscissa the frequency $f_H$ of the low frequency component and as the ordinate $V_H$, the voltage of the high frequency component. In the curves of FIG. 14, temperature is the parameter and $f_L$=500 Hz. As is evident, the threshold voltage is strongly dependent upon the temperature. As a result, when $f_L$=500 Hz and $f_H$=11 kHz, picture cells are always in the ON state at 40° C. and always in the OFF state as 0° C. Consequently, under such conditions the display effect is entirely lost. The present invention completely overcomes this difficulty and provides a liquid crystal display device by which a normal display effect can be obtained regardless of change of temperature. In order to achieve this performance, it is necessary that the contrast between the ON and OFF states be independent of temperature change. In other words, the voltage-contrast characteristics as shown in FIG. 15 must be such that $V_{OFF}/V$th must be constant. Returning once more to equations (17), (18) and (19), it becomes evident that the threshold voltage value $V_L$ in these formulas is not obtained from the actual applied signal. That is to say, $V_L$ is supposed to be the threshold voltage value when using a simple rectangular wave form of frequency $f_L$ and is obtained by converting the threshold voltage $V_H$ of the compounded wave of $f_L$ and $f_H$ as shown in FIg. 11B into the threshold voltage of the simple rectangular wave form of frequency $f_L$.

From the above facts, it follows that in order to perform temperature compensation without changing the voltage $V_H$ of the applied signal, the two threshold voltages of $V_L$ and $V_H$ should be constant regardless of temperature change. Therefore, it is advantageous that the threshold voltages at each temperature are adjusted to $V_L$ and $V_H$ by changing the values of $f_L$ and $f_H$ which determine $V_L$ and $V_H$.

The method by which appropriate values of the two frequency components and of the two voltages of the two frequency components are selected is as follows: First consider the two frequencies $f_L$=500 Hz and $f_H$=11 kHz at 20° C. as shown in FIGS. 11A an 11B. If the temperature is raised to 40° C., then the picture cell can be converted to be permanently in the ON state by making $f_L$=2.1 kHz and $f_H$=40 kHz in which case the voltage-contrast curve which is almost the same as that shown in FIG. 12 with the high contrast as obtained at 20° C. can be obtained. On the other hand, when the temperature drops to 0° C., the same characteristic as that at 20° C. can be obtained by setting $f_L$=240 Hz and $f_H$=1.5 kHz. However, in this case, the number of lines is sixteen so that the frame frequency becomes 15 Hz. As a result, the display flickers. When n=16, it is necessary that $f_L$ must be equal at least to 400 Hz. Accordingly, $f_L$ is set equal to 500 Hz. Then the value of Vth as shown in FIG. 15 changes and the value which is 3.2 V at 20° C. becomes 5.9 V at 0° C. It is important for maintaining contrast that the ratio $V_{OFF}/V$th and that of $V_{ON}/V$th be held constant so that when Vth is 5.9 V, the same contrast as that at 20° C. can be obtained if $V_{OFF}$ is 5.7 V and $V_{ON}$ is 14.9 V. Thus, if Vth=$V_L$ is substituted into formula (18), $V_{OFF}$=5.7 V is obtained. Next substituting $V_L$=5.9 V and $V_{ON}$=14.9 V into equation (17), the results $V_H$=55 V is obtained. Then the value of $f_H$ which makes $V_H$=55 V in FIG. 14 becomes 5.9 kHz. Consequently, when the temperature is 0° C., the same contrast as that at 20° C. is obtained by making $f_L$=500 Hz, $f_H$=5.9 kHz and $V_H$=55 V.

Figure 16:
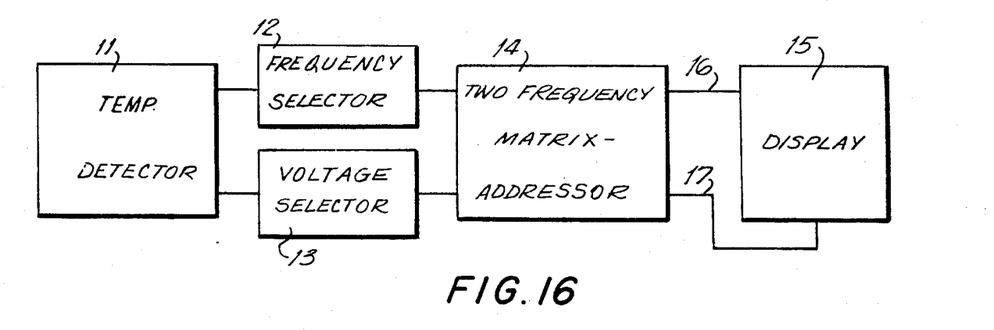
FIG. 16 shows schematically the circuitry for maintaining the performance of the display device as the temperature changes.

The way in which temperature compensation is affected is illustrated in FIG. 16 in which temperature detector 11 includes a circuit element which has a reproducible response to change in temperature, such circuit elements being well-known to those skilled in the art. The output from temperature detector 11 is then transmitted to frequency selector 12 and voltage selector 13 for adjusting at least one of the voltage and the frequency of at least one of the low-frequency and the high-frequency components of the output from two-frequency matrix-addressor 14 to display 15. The output from matrix-addressor 14 travels over lines 16 and 17 for XY addressing.

As is evident, then, the present invention in its several embodiments provides a display which is essentially independent of the number of lines in same, so far as contrast is concerned, and which can be rendered independent of temperature.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention, which, as a matter of language, might be said to fall therebetween.

What is claimed is:

1. A liquid crystal display device for operation in the twisted nematic mode, comprising liquid crystal display means including a matrix of display elements and two-frequency matrix-addressing means for supplying a two-frequency output including a high frequency signal $f_H$ and a low frequency signal $f_L$ for the multiplexed driving of said display elements in said display means, said liquid crystal display means containing a liquid crystal display cell including a nematic liquid crystal material having a critical frequency, $f_c$, intermediate the lower and higher frequency components in said output, the dielectric anisotropy of said liquid crystal material being positive at said lower frequency, $f_L$ and negative at said higher frequency, $f_H$, said matrix-addressing means connected to said display cell and being arranged and constructed for applying thereto said higher frequency component $f_H$ as a timing signal for placing the element in a selected condition and as a data signal for turning said element ON and OFF, said higher frequency data signal being in phase with said high frequency timing signal for placing selected display elements in an ON condition and said high frequency data signal being 180° out-of-phase with said high frequency timing signal for placing the display elements in a selected condition into an OFF condition and applying said lower frequency signal $f_L$ as a timing signal to the non-selected display elements.

2. A liquid crystal display device for operation in the twisted nematic mode, comprising a liquid crystal display cell including a plurality of display elements in matrix array, two-frequency matrix-addressing means for supplying a two-frequency output including a high frequency component $f_H$ and a low frequency component $f_L$ for selective driving of said display elements in said display cell, said liquid crystal display cell containing a nematic liquid crystal material having a critical frequency, $f_c$, intermediate the lower and higher frequency components, $f_L$ and $f_H$, respectively, in said output of said matrix-addressing means, the dielectric anisotropy of said liquid crystal material being positive at said lower frequency and negative at said higher frequency, said matrix-addressing means coupled to said cell for applying to selected display elements said higher frequency component $f_H$ as a timing signal for placing the element in a selected condition and as a data signal for turning said elements ON and OFF, said high frequency data signal being in phase with said high frequency timing signal for placing the selected display element in an ON condition and said high frequency data signal being 180° out-of phase with said high frequency timing signal for placing the selected display element in an OFF and applying said lower frequency signal $f_L$ as a timing signal to the non-selected display elements and means for determining the temperature of said display cell for adjusting the output of said matrix-addressing means for compensating for the effect of temperature change on the performance of the display cell.

3. The liquid crystal display device as defined in claim 2, further comprising means for adjusting at least one of the frequencies $f_L$ and $f_H$ of said output in accordance with the temperature as determined by said temperature-determining means for compensating for the effect of temperature change on the performance of said display means.

4. The liquid crystal display device of claim 2 or 3 further comprises means for adjusting the voltage of said output in accordance with the temperature as determined by said temperature-determining means for compensating for the effect of temperature change on the performance of said display means.

* * * * *